(12) United States Patent
Kim

(10) Patent No.: US 7,586,750 B2
(45) Date of Patent: Sep. 8, 2009

(54) MODULAR POWERLINE ADAPTERS AND METHODS OF USE

(75) Inventor: John Kim, Los Angeles, CA (US)

(73) Assignee: Belkin International, Inc., Compton, CA (US)

( * ) Notice: Subject to any disclaimer, the term of this patent is extended or adjusted under 35 U.S.C. 154(b) by 55 days.

(21) Appl. No.: 11/927,128

(22) Filed: Oct. 29, 2007

(65) Prior Publication Data

US 2009/0109638 A1   Apr. 30, 2009

(51) Int. Cl.
*H05K 5/00* (2006.01)
(52) U.S. Cl. .................................... 361/732
(58) Field of Classification Search ............... 361/732, 361/786, 685, 689
See application file for complete search history.

(56) References Cited

U.S. PATENT DOCUMENTS

| | | | |
|---|---|---|---|
| 5,466,165 A | 11/1995 | Boesel et al. | |
| 6,747,859 B2 | 6/2004 | Walbeck et al. | |
| 6,967,562 B2 * | 11/2005 | Menard et al. | 340/5.64 |
| 7,462,952 B2 * | 12/2008 | Bailey | 307/9.1 |
| 2002/0185295 A1 | 12/2002 | Metcalf | |
| 2005/0010954 A1 | 1/2005 | Binder | |
| 2007/0223193 A1 * | 9/2007 | Hamman | 361/689 |
| 2008/0007909 A1 * | 1/2008 | Merkin et al. | 361/685 |
| 2008/0144270 A1 * | 6/2008 | Dal Porto et al. | 361/684 |

OTHER PUBLICATIONS

Netgear XE102 Powerline Ethernet Adapter, web page http://www.amazon.com/Netgear-XE102-Powerline-Ethernet-Adapter/dp/B00008I9KJ, printed Apr. 28, 2007.
Linksys Group Instant PowerLineUSB Adapter, web page http://www.nextag.com/powerline-usb/search-html, printed Apr. 18, 2007.
Belkin Powerline Ethernet Adapter, Part #F5D4070, web page http://catalog.belkin.com/IWCatProductPage.process?Product_Id=152644, printed Apr. 18, 2007.
Netgear Powerline Ethernet Adapters, web page http://www.netgera.com/Products/PowerlineNetworking.aspx?for=All, printed Feb. 16, 2007.
International Search Report, Dec. 23, 2008.

* cited by examiner

*Primary Examiner*—Jean F Duverne
(74) *Attorney, Agent, or Firm*—Bryan Cave LLP

(57) ABSTRACT

Embodiments of modular powerline adapters and their methods of use are generally described herein. An article to transmit and receive signals through an electrical power distribution network comprises: a first module and a second module, wherein the first module comprises an electrical plug to electrically couple to an electrical power outlet receptacle of the electrical power distribution network. The first module and second module further comprise signal connectors, and each module further comprises a housing and a plurality of electrical components located within each housing. The plurality of electrical components transmit and/or receive digital information through the electrical power distribution network. The first and second module's housing comprise mechanical attachment mechanisms to rigidly couple one module to another. Other embodiments may be described and claimed.

24 Claims, 8 Drawing Sheets

MODULAR POWERLINE ADAPTERS AND METHODS OF USE

TECHNICAL FIELD

This invention relates generally to powerline adapter devices, and relates more particularly to modular powerline adapters that provide easy transferability between one data transferring system and another, and methods of using the same.

BACKGROUND

As computing technology advances, many computer users find it beneficial to incorporate expanded computer network systems within their business and/or household, such that information and data can be shared more readily between connected computers, and also to share various programs and data inputs. To alleviate the need to hardwire such network systems together, network systems have been developed that can take advantage of existing power distribution network systems, for example, the electrical wiring traversing through a structure such as a home or office.

Currently, powerline devices that are used to take advantage of such power distribution networks are complete integral systems configured to accommodate unique data transfer conduits, for example USB cables, Ethernet cables, telephone cables, and the like. A convenient alternative for users of such powerline devices are devices comprising modular elements to accommodate a variety of data transfer cables, and/or provide for interchangeability of various data transfer elements. Invariably the user has a need to interchange between one type of data transfer conduit to another, and as technology develops, it can be beneficial to the user to have the ability to upgrade from one type of powerline device to another without having to acquire entirely new powerline devices.

Accordingly, a potential for benefit exists for modular powerline adapters that can accommodate various data transfer conduits to provide for both interchangeability between one type of data transfer conduit to another, and to allow for easy upgrading of future developed components.

Figure 1:
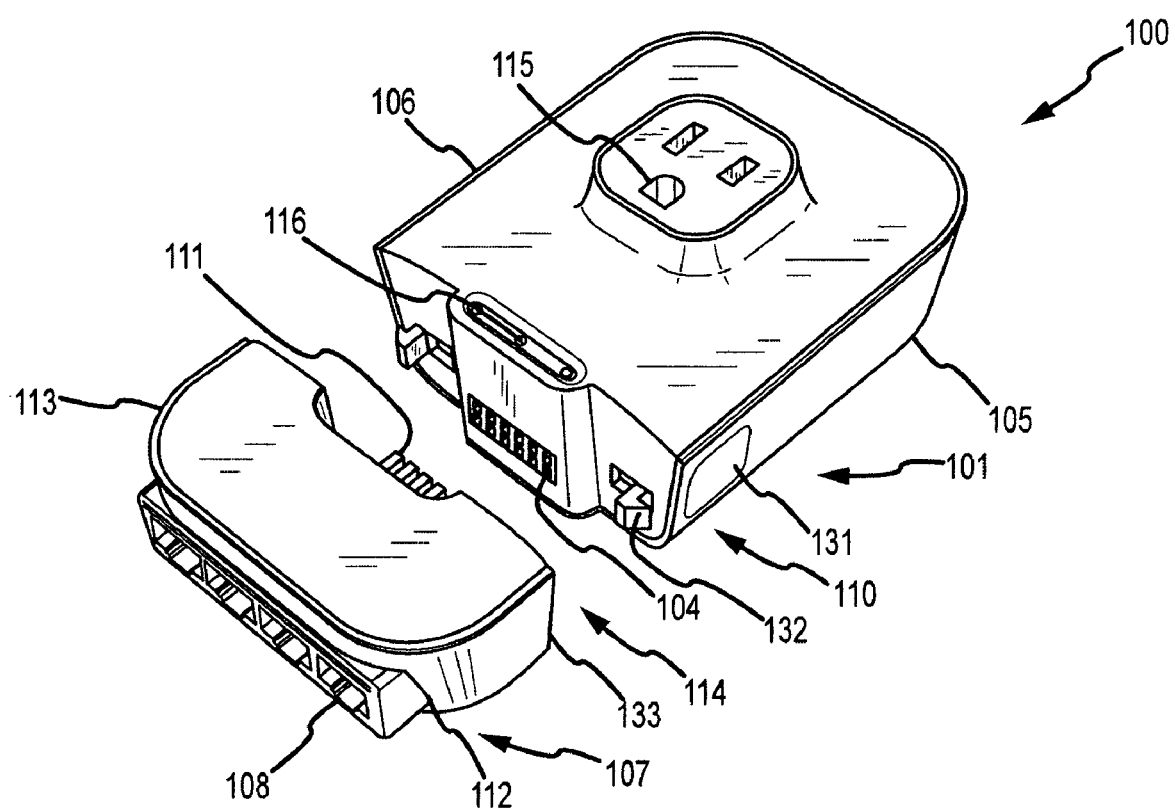
FIG. 1 illustrates an exploded isometric view of an exemplary modular powerline adapter according to a first embodiment of the invention.

For simplicity and clarity of illustration, the drawing figures illustrate a general manner of construction, and descriptions and details of well-known features and techniques can be omitted to avoid unnecessarily obscuring modular powerline adapters. Additionally, elements in the drawing figures are not necessarily drawn to scale. For example, the dimensions of some of the elements in the figures may be exaggerated relative to other elements to help improve understanding of embodiments of the modular powerline adapters and their methods of use. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of modular powerline adapters and their methods of use described herein are, for example, capable of operation in sequences other than those illustrated or otherwise described herein. Furthermore, the terms "contain," "include," and "have," and any variations thereof, are intended to cover a non-exclusive inclusion, such that a process, act, method, article, or apparatus that comprises a list of elements is not necessarily limited to those elements, but can include other elements not expressly listed or inherent to such process, act, method, article, or apparatus.

The terms "left," "right," "front," "back," "top," "bottom," "side," "under," "over," and the like in the description and in the claims, if any, are used for descriptive purposes and not necessarily for describing permanent relative positions. It is to be understood that the terms so used are interchangeable under appropriate circumstances such that the embodiments of modular powerline adapters and their methods of use described herein are, for example, capable of operation in orientations other than those illustrated or otherwise described herein. The term "coupled," as used herein, is defined as directly or indirectly coupled in a physical, mechanical, electrical, or other manner.

DESCRIPTION OF EXAMPLES OF EMBODIMENTS

According to various exemplary embodiments, an article to transmit and receive signals through an electrical power distribution network comprises: (1) a first module comprising: (a) an electrical plug to electrically couple to an electrical power outlet receptacle of the electrical power distribution network, and the first module comprises (b) a first signal connector. The first module further comprises, (c) a first housing, and (d) a first plurality of electrical components located within the first housing. According to various exemplary embodiments, the first plurality of electrical components can transmit digital information through the electrical power distribution network received by the first plurality of electrical components through the first signal connector. Furthermore, the first plurality of electrical components can transmit digital information through the first signal connector received by the first plurality of electrical components through the electrical power distribution network, and the first housing comprises, (e) a first mechanical attachment mechanism. The article further comprises, (2) a second module comprising (a) at least one first data port of a first type to electrically couple to a digital data cable of a first type, wherein the second module comprises, (b) a second signal connector to electrically couple to the first signal connector of the first module. According to various exemplary embodiments, the second module further comprises, (c) a second housing, and (d) a second plurality of electrical components located within the second housing. The second plurality of electrical components can transmit the digital information through the first data port received by the second plurality of electrical components through the second signal connector. Furthermore, the second plurality of electrical components can further transmit digital information through the second signal connector received by the second plurality of electrical components through the first data port, and, the second housing comprises, (e) a second mechanical attachment mechanism.

According to various exemplary embodiments, the first mechanical attachment mechanism and the second mechanical attachment mechanism can couple to each other substantially rigidly to couple the first module and the second module together.

According to various exemplary embodiments, a method of adapting power distribution networks for use as communication systems using different data cable connections comprises, in any order, at least the acts of: (1) obtaining or providing a plurality of modular powerline adapters, each comprising a housing configured to mechanically and electrically couple to at least one of a plurality of outlet extensions; (2) obtaining or providing a plurality of first outlet extensions configured to mechanically and electrically couple to the modular powerline adapters, each first outlet extension comprising at least one first communication port of a first type; and (3) obtaining or providing a plurality of second outlet extensions configured to mechanically and electrically couple to the modular powerline adapters, each second outlet extension comprising at least one second communication port of a second type.

Figure 2:
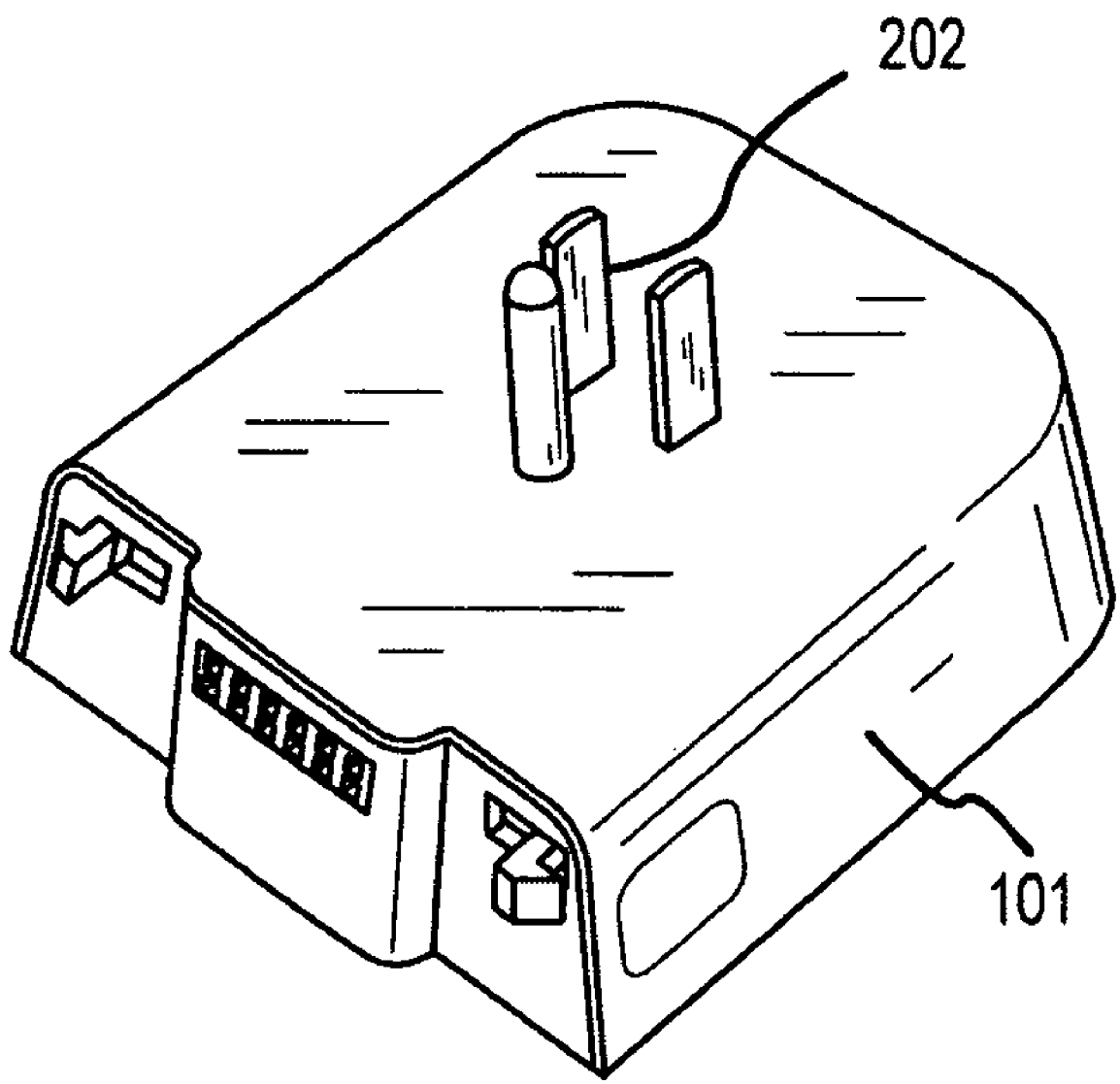
FIG. 2 illustrates a second isometric view of the exemplary modular powerline adapter of FIG. 1.
Figure 3:
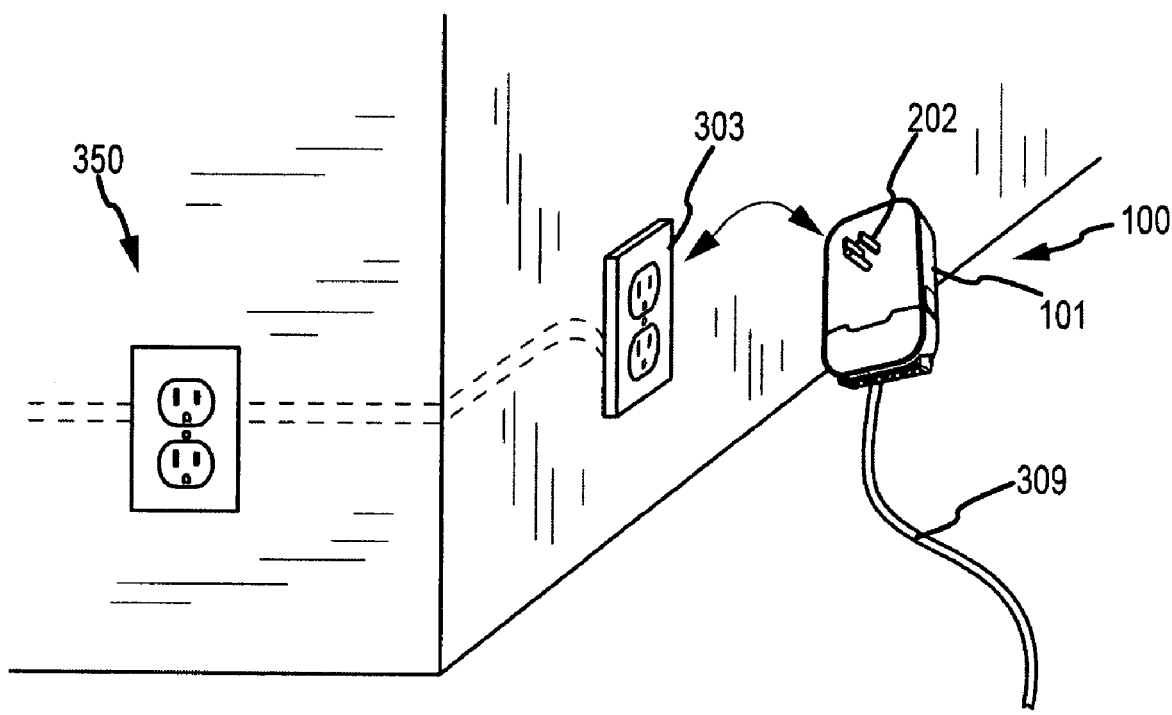
FIG. 3 illustrates a view of the exemplary modular powerline adapter of FIGS. 1 and 2, and a portion of an exemplary electrical power distribution network.

Turning now to the figures, FIG. 1 illustrates, according to an exemplary embodiment, an article 100 to transmit and receive signals through an electrical power distribution network 350 (FIG. 3). The article 100 comprises: a first module 101 comprising an electrical plug 202 (FIG. 2) to electrically couple to an electrical power outlet receptacle 303 (FIG. 3) of electrical power distribution network 350. First module 101 (FIG. 1) comprises a first signal connector 104, and first module 101 further comprises: a first housing 105 and a first plurality of electrical components 106 located within first housing 105. First plurality of electrical components 106 can transmit digital information through electrical power distribution network 350 received by first plurality of electrical components 106 through first signal connector 104. First plurality of electrical components 106 can further transmit digital information through first signal connector 104 received by first plurality of electrical components 106 through electrical power distribution network 350, and first housing 105 comprises a first mechanical attachment mechanism 110. Article 100 further comprises a second module 107 comprising of at least one first data port 108 of a first type to electrically couple to a digital data cable 309 (FIG. 3) of a first type, second module 107 also comprises a second signal connector 111 to electrically couple to first signal connector 104 of first module 101. Second module 107 further comprises: a second housing 112, and a second plurality of electrical components 113 located within second housing 112. In this exemplary embodiment, second plurality of electrical components 113 can transmit the digital information through first data port 108 received by second plurality of electrical components 113 through second signal connector 111. Second plurality of electrical components 113 can further trans- mit digital information through second signal connector 111 received by second plurality of electrical components 113 through first data port 108; and second housing 112 comprises a second mechanical attachment mechanism 114. First mechanical attachment mechanism 110 and second mechanical attachment mechanism 114 can couple to each other substantially rigidly to couple first module 101 and second module 107 together.

Continuing with an exemplary embodiment of the modular powerline adapters and their methods of use, article 100 comprises first module 101. As shown in FIG. 1, first module 101 can couple to second module 107. However, other exemplary embodiments can comprise first module 101 coupled to other modules. For example, first module 101 can be coupled to a single second module, such as second module 107, or a third module, or a combination of multiple modules, etc.

In this exemplary embodiment, first module 101 further comprises electrical plug 202 (FIG. 2). Exemplary electrical plug 202 is shown as comprising a standard U.S. three prong plug configuration. Other exemplary embodiments comprising different plug configurations, however, are likewise contemplated by this disclosure. For example, electrical plug 202 can comprise a plug configuration to accommodate non-U.S. standard electrical outlets, or other plug configurations not expressly described herein. Moreover, first module 101 is shown comprising merely a single electrical plug 202, but other exemplary embodiments can comprise first module 101 comprising more than a single electrical plug, for example, two electrical plugs to accommodate a dual electrical outlet.

In this exemplary embodiment, power outlet receptacle 303, which can be part of electrical power distribution network 350, comprises a standard dual outlet, typical of U.S. electrical power distribution networks. Article 100, and particularly electrical plug 202, comprises a configuration such that electrical plug 202 can be electrically coupled to power outlet receptacle 303. In this exemplary embodiment, electrical plug 202 can be electrically coupled to either one of the dual outlets of power outlet receptacle 303. Moreover, in other exemplary embodiments, power outlet receptacle 303 can comprise other configurations to accommodate various types of electrical plugs. For example, in one exemplary embodiment, power outlet receptacle 303 can comprise a configuration to accommodate a non-U.S. standard electrical plug, and/or multiple plug configurations, such as a four plug outlet.

Continuing with the exemplary embodiment, and as shown in FIG. 1, first module 101 comprises first signal connector 104. As can be seen from the exemplary embodiment of FIG. 1, first signal connector 104 can be electrically coupled to a second signal connector 111 of second module 107. First signal connector 104 and second signal connector 111, in this exemplary embodiment, can electrically couple to allow an electrical signal from first module 101 to transfer to second module 107, and vice versa. In this exemplary embodiment, first signal connector 104 comprises a female connection that can couple to the male connection of second signal connector 111. Other embodiments, though, can comprise other electrical connections that allow for a signal to transfer from one module to the other.

In this exemplary embodiment, module 101 comprises a first housing 105 to provide housing and/or support for the various elements disclosed and described herein. For example, and with continuing reference to FIG. 1, housing 105 encases first plurality of electrical components 106, as well as provide a structure to accommodate, for example, electrical plug 202, first signal connector 104, a module power outlet receptacle 115, a status indicator 116, and the like. Moreover, while an exemplary configuration of housing 105 is depicted in FIG. 1, other housings that can provide housing, and support the various elements described herein, is likewise contemplated by this disclosure.

In this exemplary embodiment, first module 101 comprises first plurality of electrical components 106. First plurality of electrical components 106 comprises various electrical components to manipulate, transfer, redirect, configure, and/or filter, the electrical signal received from, or transferred to second module 107 and/or electrical power distribution network 350. This disclosure likewise contemplates other embodiments of a plurality of electrical components that provide to manipulate an electrical signal. For example, in this exemplary embodiment, first plurality of electrical components 106 comprises, among other electrical components, a noise filter to filter the noise associated with a device that may be electrically coupled to module power outlet receptacle 115 such that the noise filter inhibits or reduces interference from the coupled device with the data and/or electrical signal that first module 101 transfers or receives from electrical power distribution network 350 or second module 107.

Figure 5:
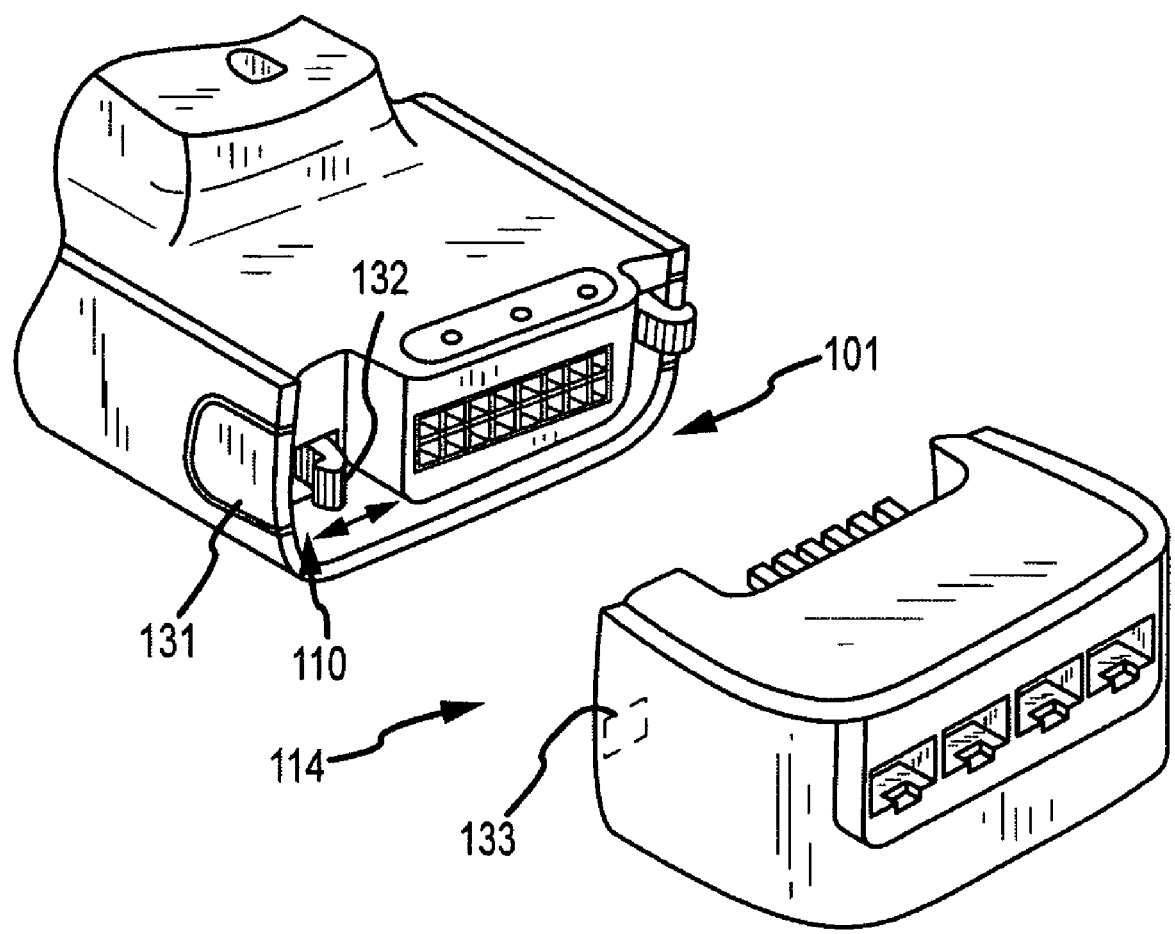
FIG. 5 illustrates an exploded isometric view of the exemplary modular powerline adapter of FIGS. 1-4 showing an exemplary coupling mechanism, signal connectors, housings, status indicators, and data ports.

Continuing with the exemplary embodiment of article 100, article 100 comprises first module 101 comprising first mechanical attachment mechanism 110, and second module 107 comprising second mechanical attachment mechanism 114. These two attachment mechanisms couple first module 101 and second module 107 together in a substantially rigid fashion such that first signal connector 104 and second signal connector 111 can couple together to transfer the signal between them as described earlier. In this exemplary embodiment, and further depicted in FIG. 5, first mechanical attachment mechanism 110 comprises a spring actuated release mechanism 131 coupled to a latch element 132. As release mechanism 131 is pressed, latch 132 actuates accordingly such that latch 132 couples or engages to catch 133 of second mechanical attachment mechanism 114 of second module 107. Once first module 101 and second module 107 are coupled together, release mechanism 131 can then be released and latch element 132 can engage catch 133, thereby substantially rigidly coupling first module 101 and second module 107 together. While the exemplary embodiment described herein discloses the release/latch/catch mechanism for article 100, other coupling mechanisms are likewise contemplated by this disclosure. For example, snap fittings, magnetic couplings, screws, bolts, pins, and/or other fasteners, catches, hooks, and latches may be used so that first module 101 and second module 107 can be suitably coupled together.

Figure 6:
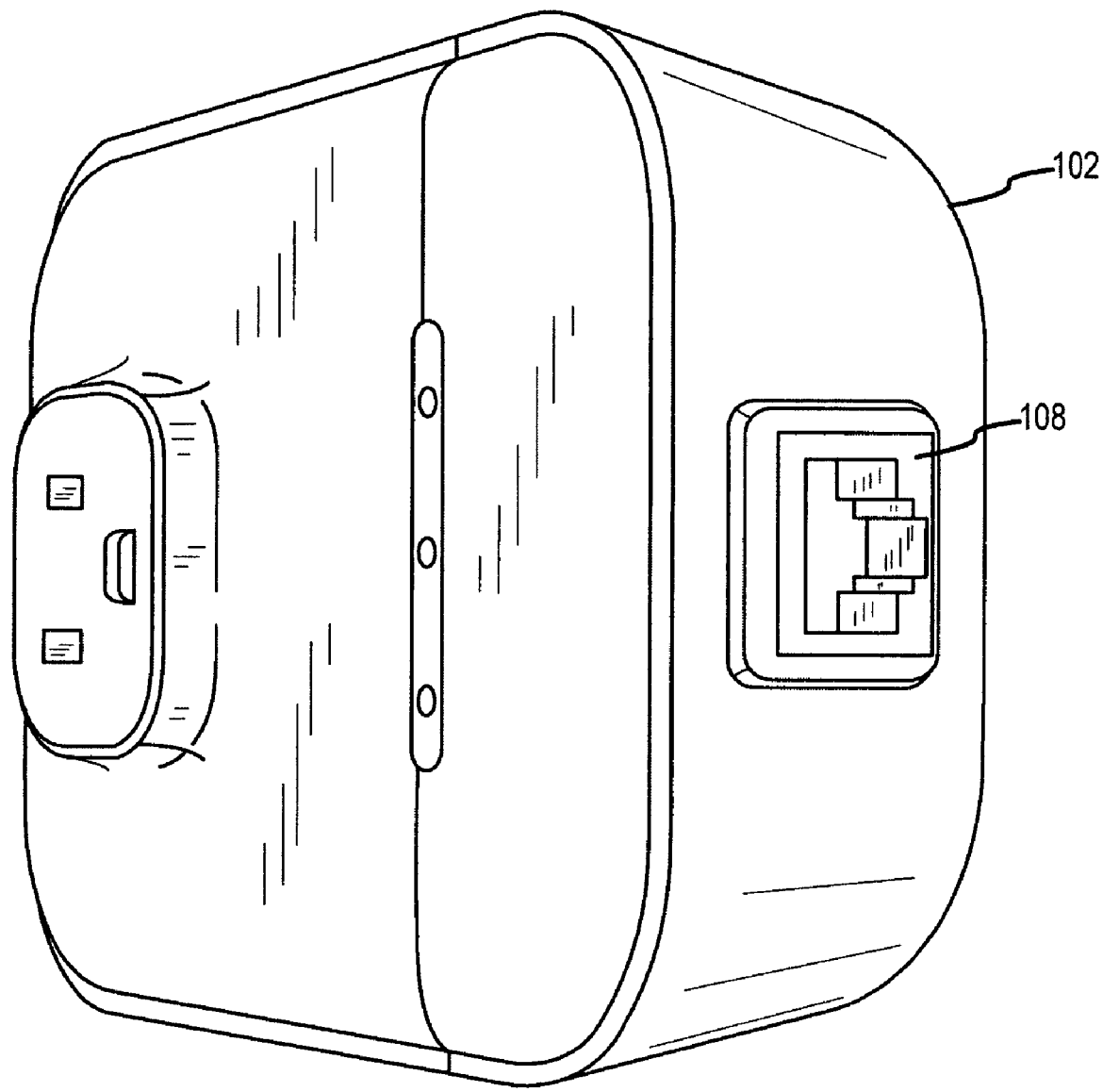
FIG. 6 illustrates an isometric view of the exemplary modular powerline adapter of FIGS. 1-5 showing a single data port.
Figure 7:
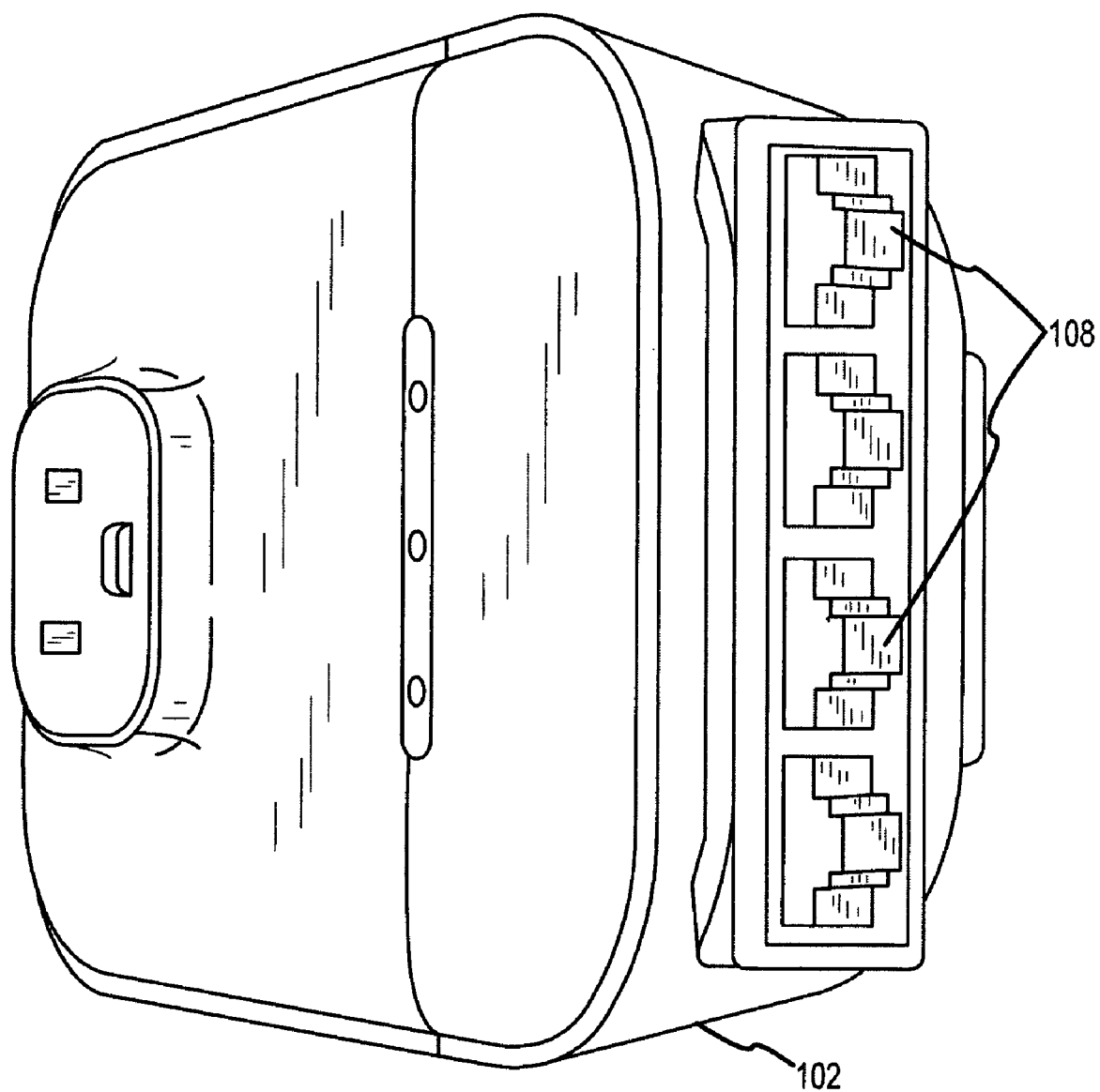
FIG. 7 illustrates an isometric view of the exemplary modular powerline adapter of FIGS. 1-6 showing multiple data ports.

Continuing with the exemplary embodiment of article 100, and that has been briefly described so far in this disclosure, article 100 comprises second module 107. Second module 107 comprises: second signal connector 111 to transfer and/or receive the signal to/from first module 101; second mechanical attachment mechanism 114 to substantially rigidly coupled second module 107 to first module 101; second plurality of electrical components 113; and data port 108. In this exemplary embodiment and with reference to FIGS. 6 and 7, second module 107 comprises data port 108. As can be seen in FIG. 6, second module 107 comprises a single data port, while the exemplary embodiment shown in FIG. 7 depicts second module 107 comprising multiple data ports. In this manner, and among other various exemplary embodiments, various permutations of first module 101 coupled to second module 107 can be configured to accommodate various configurations for transferring signals, coupling to various power outlet receptacles, comprising various power outlet receptacles, and any other updated or newly developed features that can claim the benefit of the article described herein. For example, second module 107 can comprise a single data port 108 as shown in FIG. 6 that can accommodate a RJ45 data connector. However, future technological developments may require data connectors of a different type. In this manner, instead of a user purchasing an entirely new article, the user may only need to acquire a new module 107. Moreover, by having various modules, the user may not need to own an entire line of articles, but merely only the second modules for the user's particular needs.

In this exemplary embodiment, second module 107 comprises standard data port 108. As briefly mentioned previously, standard data port 108 can comprise one or more data ports, as shown in FIGS. 6 and 7; however, standard data port 108 can comprise not only one or more data ports of the same type, but data ports of different types, as well as a combination of different types. For example, second module 107 can comprise a single RJ45 data port, or multiple RJ45 data ports. In another exemplary embodiment, second module 107 can comprise a single USB data port, or multiple USB data ports. Still yet, in other exemplary embodiments, second module 107 can comprise a combination of USB and RJ45 data ports. In this manner, a user can acquire the second module comprising the data ports in the number or combination they desire. Other embodiments may comprise other electrical connections or other ports.

Figure 4:
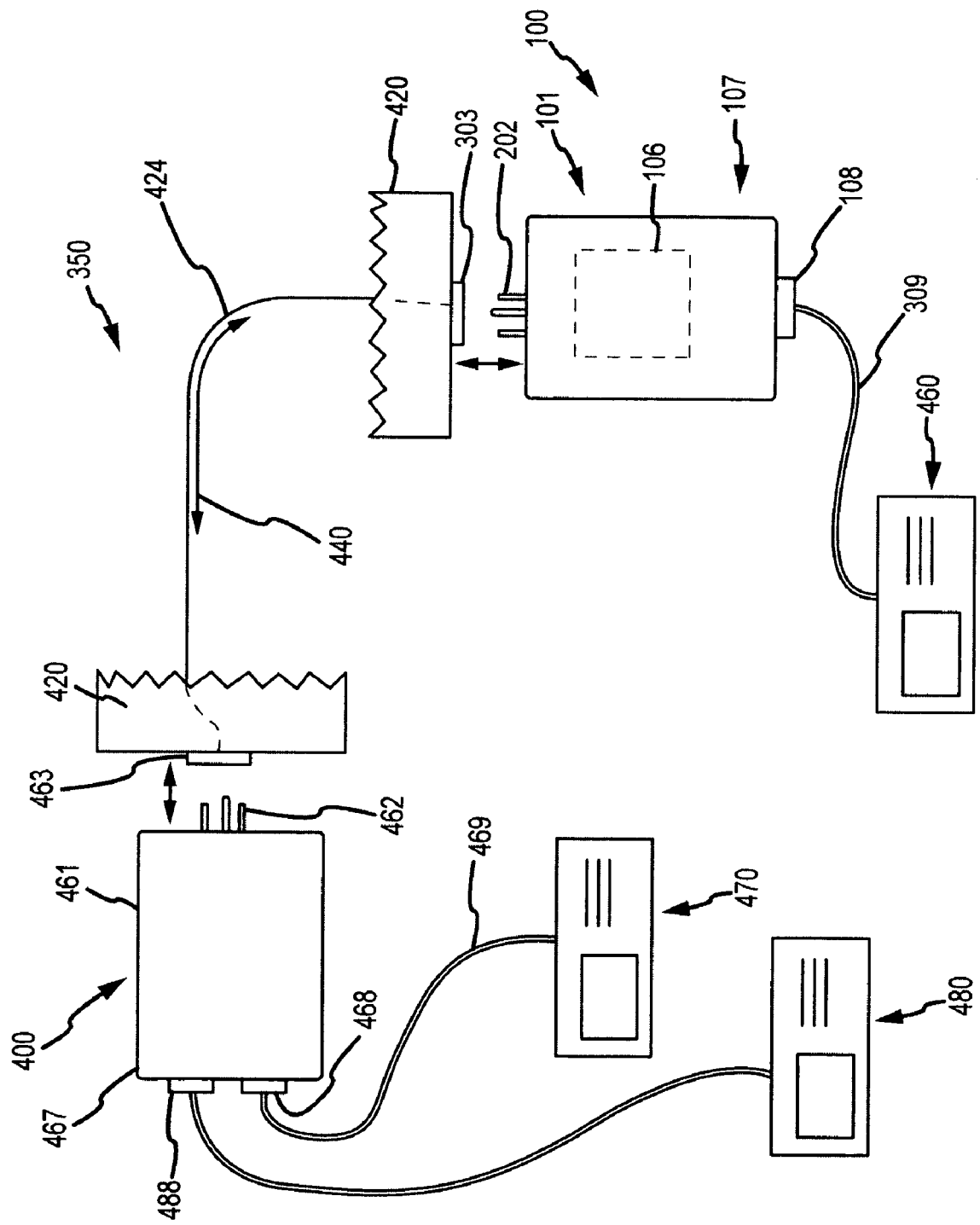
FIG. 4 illustrates a view of the exemplary modular powerline adapter of FIGS. 1-3, and the electrical power distribution network of FIG. 3.

With reference to FIG. 4, and in this exemplary embodiment, article 100 can be coupled via data port 108 to a standard digital data cable 309. Standard digital cable 309 comprises the appropriate cable to accommodate the type of data port 108 connection, for example, a USB cable or a RJ45 cable, etc. As can be seen in FIG. 4, cable 309, in a hardwire fashion, couples a network component 460, such as a computer, to article 100.

In this exemplary embodiment, second module 107, in similar fashion to first module 101, comprises a second housing 112 to provide housing and/or support for the various elements disclosed and described herein. For example, and with continuing reference to FIG. 1, housing 112 encases second plurality of electrical components 113, as well as provides a structure to accommodate, for example, second signal connector 111, second mechanical attachment mechanism 114, first standard data port 108, and the like. Moreover, while an exemplary configuration of housing 112 is depicted in FIG. 1, other housings that can provide housing and/or support the various elements described herein are likewise contemplated by this disclosure.

In similar fashion to first module 101, second module 107 comprises second plurality of electrical components 113. Second plurality of electrical components 113 may comprise various electrical components to manipulate, transfer, redirect, configure, and/or filter, the electrical signal received from, or transferred to first module 101 and/or electrical power distribution network 350. This disclosure likewise contemplates other embodiments of a plurality of electrical components that provide to manipulate an electrical signal. For example, in some embodiments, second plurality of electrical components 113 comprises, among other electrical components, a noise filter to filter the noise associated with a device that may be electrically coupled to power outlet receptacle 115 such that the noise filter inhibits interference from the coupled device with the data and/or electrical signal that first module 101 transfers or receives from electrical power distribution network 350, or that second module 107 transfers or receives from first module 101 and/or power distribution network 350.

In accordance with this exemplary embodiment, and as part of an exemplary method of use, article 100 can be coupled to and/or part of electrical power distribution network 350. With reference to FIG. 4, an exemplary power distribution network 350 and its relationship to article 100, is shown. As explained briefly above, power distribution network 350 comprises an alternative manner to assemble a data transfer (computer) network by taking advantage of, for example, the electrical wiring in a home or office, instead of relying upon a separately installed hardwire or wireless system. In this exemplary embodiment, power distribution network 350 comprises power outlet receptacle 303 coupled to internal electrical wiring 421 that can be coupled to another power outlet receptacle 463. In this exemplary embodiment, power outlet receptacle 303 can be mounted in or on a wall 420. This exemplary embodiment shows power distribution network 350 coupling electrical receptacle 303 to electrical receptacle 463 via electrical wiring 421, but multiple electrical receptacles coupled to a continued and/or branched wiring of wiring 421 is likewise contemplated by this disclosure.

With continued reference to FIG. 4, article 100 is further shown coupled to a data transfer component 460, such as a computer. In this exemplary embodiment, component 460 can be coupled to data port 108 of second module 107 of article 100, via standard digital cable 309. Second module 107 can be subsequently coupled to first module 101, wherein via electrical plug 202, first module 101 can be coupled to power outlet receptacle 303. As can be seen in FIG. 4, power outlet receptacle 303 can be coupled to another power outlet receptacle 463 via electrical wiring 421 that allows data 440 to travel back and forth between power outlet receptacles 303 and 463. As shown, power outlet receptacle 463 can be coupled to a second article 400 via electrical plug 462 coupled to first module 461 of second article 400. With continued reference to second article 400, first module 461 can be further coupled to second module 467, which can be coupled to another data transfer component 470 via a second standard digital cable 469 at data port 468. In this exemplary embodiment, one exemplary benefit of the modular powerline adapters described can be seen. For example, the first article shows article 100 comprising first module 101 coupled to second module 107 comprising a single data port 108, alternatively, second article 400 comprising first module 461 coupled to second module 467 comprises multiple data ports 468 and 488. Thus it is clear to see how various articles can comprise modular elements to suit the needs of a user. As can be further seen by FIG. 4, a second module 467 comprising multiple data ports 468 and 488, a third data transfer component 480 can be coupled to the power distribution network 350.

With return reference to FIG. 1, first module 101 of article 100 further comprises module power outlet receptacle 115. In this exemplary embodiment, receptacle 115 comprises a standard U.S. outlet receptacle to accommodate a respective plug from a device. By first module 101 of article 100 incorporating receptacle 115, a user can still take advantage of the functionality of power outlet receptacle 303 that article 100 can be plugged into. Receptacle 115 can provide the electrical connection from power distribution network 350 (FIG. 3) through module 101, via first plurality of electrical components 106 and electrical plug 202 coupled to power outlet receptacle 303. Among other exemplary embodiments though, and as briefly discussed earlier, receptacle 115 can comprise other outlet patterns to accommodate various other electrical plug configurations, for example non-U.S. standard plugs. Moreover, while article 100 shows first module 101 comprising merely a single receptacle 115, other exemplary embodiments can comprise multiple electrical receptacles. Furthermore, while electrical receptacle 115 is shown on one side of module 101, other exemplary embodiments can comprise electrical receptacles on various other sides of module 101. Various combinations of receptacle types, number of receptacles, and other electrical connections are likewise contemplated by this disclosure.

Continuing with the exemplary embodiment of modular powerline adapters and their methods of use, article 100 comprises status indicator 116. Status indicator 116 comprises LED light indicators, for example, to signal a user of various types of operations or functions carried out by article 100. In this exemplary embodiment, status indicator 116 comprises at least one LED light to indicate for example: (1) whether there is data transfer between first module 101 and second module 107; (2) whether there is power supplied to the article 100; (3) whether article 100 detects the power distribution network 350 or a combination thereof. Status indicator 116 can comprise a combination of LED lights. For example, in this exemplary embodiment, status indicator 116 comprises three LED light indicators as part of module 101. Other exemplary embodiments, though, may comprise status indicators as part of second module 107, or as a separate status indicator module altogether. Furthermore, other exemplary embodiments may comprise indicators of different types. For example, instead of LED indicator lights, an article can comprise a digital status readout display, lights of varying colors, audible indicators, LCD or other type of indicator that can function to provide status to a user as to the current functionality of the article and/or data, electrical components, coupled devices, and the like.

Figure 8:
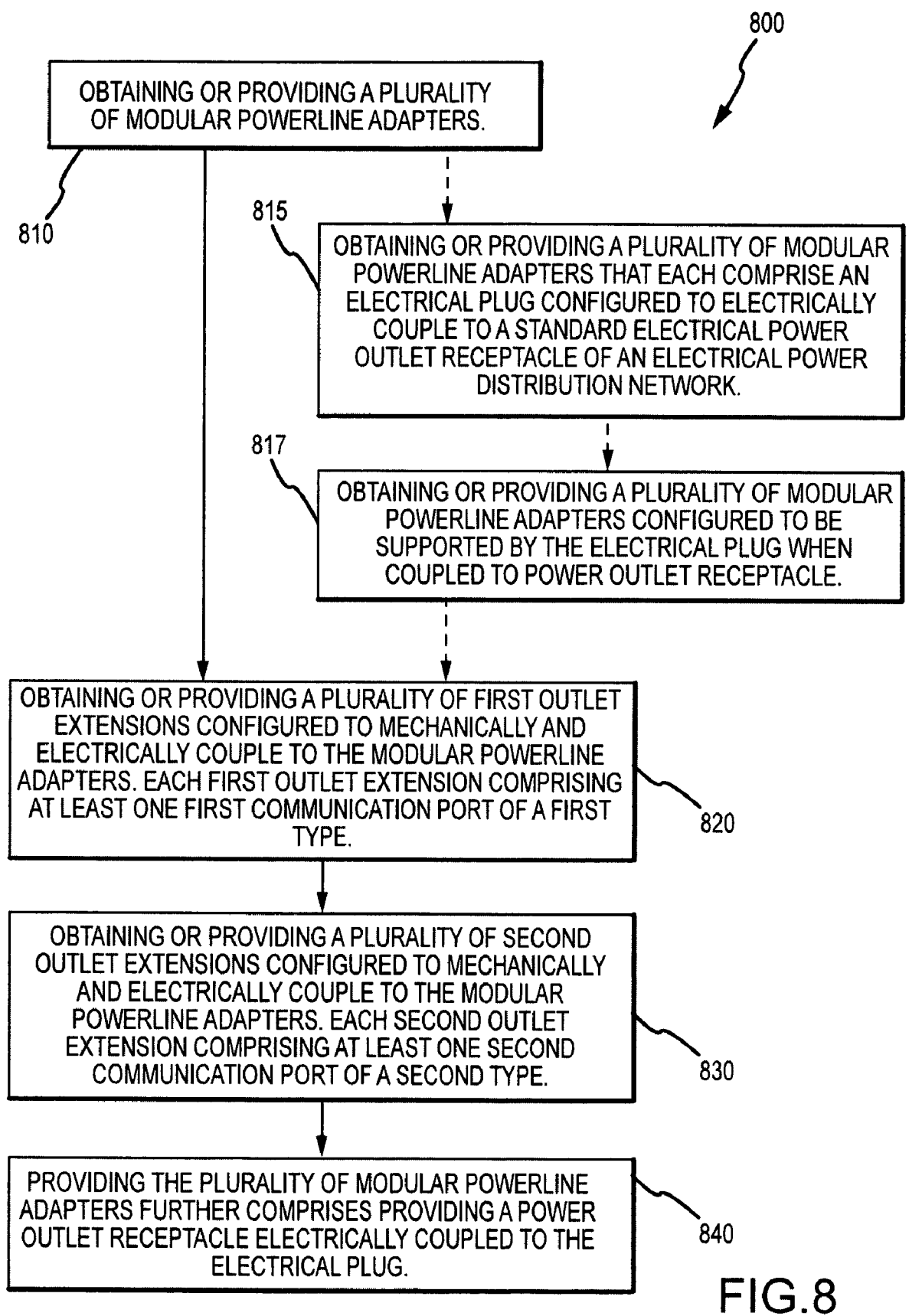
FIG. 8 shows an exemplary flowchart of an exemplary manner to use the modular powerline adapter with an electrical power distribution network.

With reference to FIG. 8, an exemplary method 800 of adapting power distribution networks for use as communication systems using different data cable connections is contemplated. The method 800 comprises, e.g., in any order, at least the acts of: (1) obtaining or providing a plurality of modular powerline adapters (act 810), each adapter comprising a housing configured to mechanically and electrically couple to at least one of a plurality of outlet extensions; (2) obtaining or providing a plurality of first outlet extensions configured to mechanically and electrically couple to the modular powerline adapters (act 820), each first outlet extension comprising at least one first communication port of a first type; and (3) obtaining or providing a plurality of second outlet extensions configured to mechanically and electrically couple to the modular powerline adapters (act 830), each second outlet extension comprising at least one second communication port of a second type. In this exemplary method embodiment, the power distribution network can be similar to the power distribution network 350 described herein, the modular powerline adapters can be similar to the first module 101, and the first or second outlet extensions can be similar to the second module 107, wherein the communication port can be similar to the data port 108 described earlier herein.

In a continuing exemplary method, the act of obtaining or providing a plurality of modular powerline adapters further comprises: obtaining or providing a plurality of modular powerline adapters that each comprise an electrical plug configured to electrically couple to a electrical power outlet receptacle of an electrical power distribution network (act 815). The modular powerline adapters can be configured to be supported by the electrical plug when coupled to the power outlet receptacle (act 817), for example.

In a continuing exemplary method, the act of obtaining or providing the plurality of modular powerline adapters (act 815) further comprises providing a power outlet receptacle electrically coupled to the electrical plug (act 840).

In an embodiment of modular powerline adapters and their methods of use, and with reference to FIG. 8, method 800 comprises acts for using a modular powerline adapter.

Although a particular order of actions is illustrated in FIG. 8, these actions can be performed in other temporal sequences. For example, the actions depicted in FIG. 8 can be performed sequentially, concurrently, in reverse order, or the like. Also, the providing acts in the described method of FIG. 8 can include designing and/or manufacturing processes or activities. Additionally, the act 810 can be performed before or after the acts 820, 830 and/or 840, and the act 840 can be performed before or after the acts 820 or 830. Other variations are also contemplated herein.

Additional examples of such changes have been given in the foregoing description. Accordingly, the disclosure of embodiments of modular powerline adapters and methods of use is intended to be illustrative of the scope of modular powerline adapters and methods of use, and is not intended to be limiting. For example, in one embodiment, a modular powerline adapter can have one or more features of FIG. 1, with or without the features described with reference to FIGS. 2-7. Other permutations of the different embodiments comprising one or more of the features of the various figures are likewise contemplated. It is intended that the scope of such modular powerline adapters and its method of use shall be limited only to the extent required by the appended claims.

The modular powerline adapters and their methods of use discussed herein can be implemented in a variety of embodiments, and the foregoing discussion of these embodiments does not necessarily represent a complete description of all possible embodiments. Rather, the detailed description of the drawings, and the drawings themselves, disclose at least one preferred embodiment of a modular powerline adapter and its method of use, and can disclose alternative embodiments of modular powerline adapters and their methods of use.

All elements claimed in any particular claim are essential to modular powerline adapters or their methods of use claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An article to transmit and receive signals through an electrical power distribution network, the article comprising:
    a first module comprising:
        a first housing comprising a first mechanical attachment mechanism;
        an electrical plug coupled to the housing and configured to electrically couple to an electrical power outlet receptacle of the electrical power distribution network;
        a first plurality of electrical components located within the first housing and coupled to the electrical plug; and
        a first signal connector coupled to the first housing and to the first plurality of electrical components;
    a second module comprising:
        a second housing comprising a second mechanical attachment mechanism;
        at least one first data port of a first type coupled to the second housing and configured to electrically couple to a digital data cable of the first type;
        a second plurality of electrical components located within the second housing and coupled to the at least one first data port; and
        a second signal connector coupled to the second housing and to the second plurality of electrical components, the second signal connector further configured to electrically couple to the first signal connector of the first module;
    wherein:
        the first plurality of electrical components are configured to bidirectionally transfer digital information between the first signal connector and the electrical plug;
        the second plurality of electrical components are configured to bidirectionally transfer the digital information between the at least one first data port and the second signal connector; and
        the first mechanical attachment mechanism and the second mechanical attachment mechanism are configured to couple to each other substantially rigidly to couple the first module and the second module.

2. The article of claim 1 further comprising:
    a third module comprising:
        a third housing comprising a third mechanical attachment mechanism;
        at least one second data port of a second type coupled to the third housing and configured to electrically couple to a digital data cable of the second type;
        a third plurality of electrical components located within the third housing and coupled to the at least one second data port;
        a third signal connector coupled to the third housing and to the third plurality of electrical components, the third signal connector further configured to electrically couple to the first signal connector of the first module;
    wherein:
        the third plurality of electrical components are configured to bidirectionally transfer digital information between the at least one second data port and the third signal connector; and
        the first mechanical attachment mechanism and the third mechanical attachment mechanism are configured to couple to each other substantially rigidly to couple the first module and the third module.

3. The article of claim 1, wherein the first module further comprises:
    a release button, wherein the second housing releases from the first housing when the release button is pressed.

4. The article of claim 1, wherein the first module further comprises multiple power outlet receptacles electrically coupled to the electrical plug.

5. The article of claim 2, wherein the second housing and the third housing comprise substantially the same shape and dimensions except for the data ports.

6. The article of claim 1, wherein:
    the at least one first data port of the first type comprises an RJ45 data port;
    the second module further comprises at least one USB data port coupled to the second housing; and the second plurality of electrical components located within the second housing are further coupled to the at least one USB data port.

7. The article of claim 1, wherein:
the first data port of the first type comprises a USB data port.

8. The article of claim 4, wherein:
at least a first one of the one or more power outlet receptacles electrically coupled to the electrical plug further comprises a non-U.S. standard power outlet receptacle configuration.

9. The article of claim 1, further comprising at least one status indicator.

10. The article of claim 9, wherein the status indicator comprises at least one of a data transfer indicator, a power indicator, or a network detection indicator.

11. The article of claim 1, wherein the second module further comprises multiple data ports of the first type.

12. The article of claim 1, wherein the second module further comprises the first data port of the first type and a second data port of a second type.

13. The article of claim 4, wherein the first module further comprises an electrical noise filter to filter electrical noise from one or more components plugged into at least a first one of the one or more the power outlet receptacle.

14. A method of adapting power distribution networks for use as communication systems using different data cable connections, the method comprising in any order at least the acts of:
providing a first modular powerline adapter comprising:
a first housing comprising a first attachment mechanism to individually couple to a plurality of outlet extensions;
a first electrical plug coupled to the first housing and configured to electrically couple to a first power outlet receptacle of a power distribution network;
a first plurality of electrical components within the first housing and coupled to the first electrical plug; and
a first signal connector coupled to the first housing and to the first plurality of electrical components;
providing a second modular powerline adapter comprising:
a second housing comprising a second attachment mechanism to individually couple to the plurality of outlet extensions;
a second electrical plug coupled to the second housing and configured to electrically couple to a second power outlet receptacle of the power distribution network;
a second plurality of electrical components within the second housing and coupled to the second electrical plug; and
a second signal connector coupled to the second housing and to the second plurality of electrical components;
providing a first outlet extension of the plurality of outlet extensions configured to mechanically and electrically couple to either of the first or second modular powerline adapters, the first outlet extension comprising:
a third attachment mechanism coupled to a housing of the first outlet extension;
at least one first communication port of a first type;
a third plurality of electrical components coupled to the at least one first communication port; and
a third signal connector coupled to the third plurality of electrical components and configured to couple to either of the first or second signal connectors of the first or second modular powerline adapters; and providing a second outlet extension of the plurality of outlet extensions configured to mechanically and electrically couple to either of the first or second modular powerline adapters, the second outlet extension comprising:
a forth attachment mechanism coupled to a housing of the second outlet extension;
at least one second communication port of a second type;
a fourth plurality of electrical components coupled to the at least one second communication port; and
a fourth signal connector coupled to the fourth plurality of electrical components and configured to couple to either of the first or second signal connectors of the first or second modular powerline adapters
wherein:
providing the first modular powerline adapter comprises:
coupling the first plurality of electrical components to bidirectionally communicate the first signal connector with the first electrical plug;
providing the second modular powerline adapter comprises:
coupling the second plurality of electrical components to bidirectionally communicate the second signal connector with the second electrical plug;
providing the first outlet extension comprises:
coupling the third plurality of electrical components to bidirectionally communicate the at least one first communication port with the third signal connector; and
providing the second outlet extension comprises:
coupling the fourth plurality of electrical components to bidirectionally communicate the at least one second communication port with the fourth signal connector.

15. The method of claim 14 further comprising:
coupling the first electrical plug to the first electrical power outlet receptacle;
coupling the second electrical plug to the second electrical power outlet receptacle.

16. The method of claim 14, wherein:
providing the first modular powerline adapter comprises:
providing a release button on the first housing to release the first modular powerline adapter from either of the first or second outlet extensions when the release button is pressed.

17. The method of claim 15, wherein:
providing the first modular powerline adapter further comprises:
providing multiple power outlet receptacles at the first housing and electrically coupled to the first electrical plug of the first modular powerline adapter.

18. The method of claim 14, wherein:
providing the first and second outlet extensions comprises:
providing the housings of the first and second outlet extensions to each comprise substantially the same shape and dimensions except for the communication ports.

19. The method of claim 14, wherein the at least one first communication port of the first type comprises a USB communication port.

20. The method of claim 14, further comprising:
coupling the first attachment mechanism of the first modular powerline adapter to the third attachment mechanism of the first outlet extension to connect the first and third signal connectors together;

coupling the first electrical plug of the first modular power adapter to the first power receptacle;

coupling the second attachment mechanism of the second modular powerline adapter to the fourth attachment mechanism of the second outlet extension to connect the second and fourth together;

coupling the second electrical plug of the second modular power adapter to the second power receptacle; and coupling the first electrical plug of the fist powerline adapter to the second electrical plug of the second powerline adapter via the power distribution network to bidirectionally transfer digital information between the first and second powerline adapters;

wherein:
the first outlet extension and the first modular powerline adapter bidirectionally transfer the digital information between each other when coupled together; and
the second outlet extension and the second modular powerline adapter bidirectionally transfer the digital information between each other when coupled together.

21. The method of claim 15, wherein:
at least one of the first or second electrical plugs comprises a non-U.S. standard power outlet receptacle configuration.

22. The method of claim 14, wherein:
providing the first modular powerline adapter further comprises providing at least one status indicator at the first housing.

23. The method of claim 22, wherein the status indicator comprises at least one of a data transfer indicator, a power indicator, or a network detection indicator.

24. The method of claim 17, wherein:
providing the first modular powerline adapter further comprises:
providing an electrical noise filter to filter electrical noise from a component plugged into the first power outlet receptacle of the first modular powerline adapter.

* * * * *

UNITED STATES PATENT AND TRADEMARK OFFICE
CERTIFICATE OF CORRECTION

PATENT NO. : 7,586,750 B2  
APPLICATION NO. : 11/927128  
DATED : September 8, 2009  
INVENTOR(S) : John Kim Page 1 of 1

It is certified that error appears in the above-identified patent and that said Letters Patent is hereby corrected as shown below:

At claim 13, (column 11, line 25), delete "receptacle" and insert --receptacles--

Signed and Sealed this

Twenty-ninth Day of December, 2009

David J. Kappos
*Director of the United States Patent and Trademark Office*